May 18, 1948.　　　O. J. HUELSTER　　　2,441,573
ONE-WAY DETACHABLE SNAP FASTENER
Filed Oct. 25, 1944
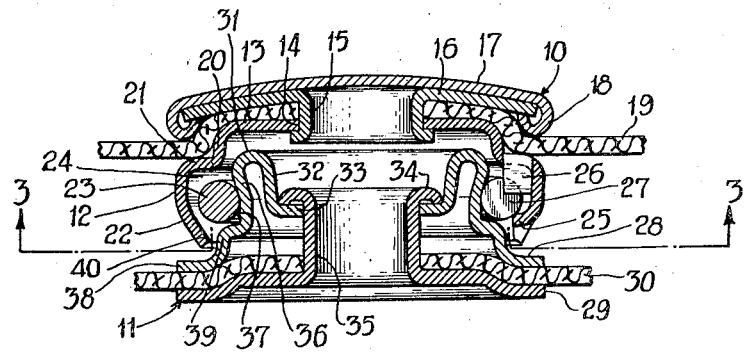
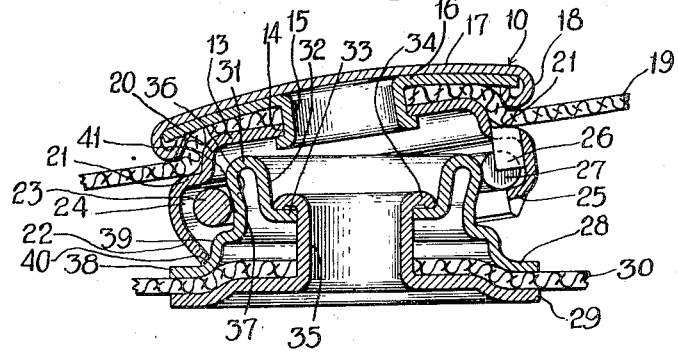
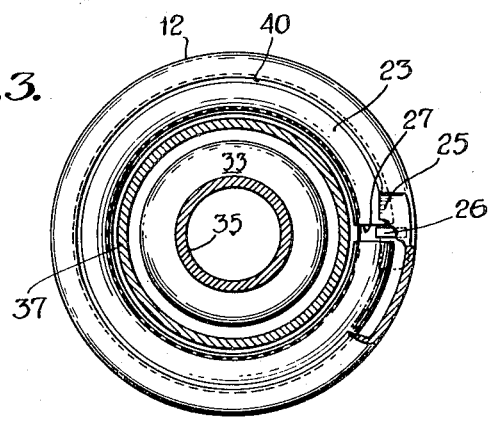
INVENTOR
OTTO J. HUELSTER
BY
ATTORNEY Patented May 18, 1948

2,441,573

UNITED STATES PATENT OFFICE 2,441,573

ONE-WAY DETACHABLE SNAP FASTENER

Otto J. Huelster, Waterbury, Conn., assignor to Scovill Manufacturing Company, New Haven, Conn., a corporation of Connecticut Application October 25, 1944, Serial No. 560,277

8 Claims. (Cl. 24—217)

This invention relates to snap fasteners employing stud and socket parts. More particularly, the invention deals with fasteners of this kind having means providing one-way opening only of the fastener parts, and still more particularly, the invention deals with the use of a key element formed from the material of the socket part adjacent an inwardly bent seat thereon adapted to be positioned between the ends of a split spring ring to definitely maintain said ends adjacent the seat in defining the point or position in the socket controlling the one-way displacement of the stud from the socket. The novel features of the invention will be best understood from the following descriptions when taken together with the accompanying drawing, in which certain embodiments of the invention are disclosed, and in which the separate parts are designated by suitable reference characters in each of the views; and in which:

Fig. 1 is an enlarged sectional view through the socket and stud parts of a fastener made according to my invention, showing the parts in normal coupled position.

Fig. 2 is a view similar to Fig. 1, illustrating the one-way detachment of the stud part from the socket part; and Fig. 3 is a section on the broken line 3—3 of Fig. 1, showing further parts broken away and in section.

In fasteners of the type and kind under consideration employing split spring rings for retaining the stud part in the socket part, difficulty has been experienced in providing free and positive one-way separation of the parts of the fastener, primarily due to the shifting of the split ring in the socket part.

In order to overcome these objectionable structural characteristics, I form from a bottom wall, or what may be termed a supplemental bottom wall of the socket member, a key element which extends into the socket in alinement with and substantially centrally of an inwardly pressed seat on the boundary wall of the socket in order to position and maintain a split of the spring ring at all times in registering position with said seat, the seat or indenture serving to support the spring ring in position in the socket to control the one-way detachment or uncoupling of the stud part with respect to the socket part of the fastener.

While the present socket construction is adaptable for use for studs having round concentric heads, as shown in the accompanying drawing, it will also appear that studs having offset heads of the type and kind disclosed in my Patent 2,328,016, granted August 31, 1943, can also be employed, but the present socket does not require the use of the offset head in providing free and easy detachment of the stud.

In the accompanying drawing, 10 represents the socket member of the fastener, and 11 the stud member. The member 10 comprises a cup-shaped casing 12 forming the socket proper of said member, the casing having a bottom wall 13 perforated centrally, as seen at 14, to receive the flared coupling sleeve 15 of a disc 16 arranged within a cap portion 17 having a peripheral inturned flange 18 enveloping the periphery of the disc. The support for the socket is shown at 19 and is disposed between the disc 16 and the bottom wall 13 of the casing 12.

The side walls of the casing 12 are offset inwardly, as seen at 20 to form a ring-like seat or supplemental bottom wall 21, whereas the free edge portion of the side walls 20 of the casing are contracted or tapered inwardly, as seen at 22, so as to retain a split spring ring 23 against displacement from the portion 24 of the socket of the casing 12.

At one section along the wall of the inturned portion 22 of the casing 12 is formed an inwardly pressed seat 25, as seen at the right of Figs. 1 and 2 of the drawing. The seat or bearing portion 25 is adapted to maintain the spring ring 23 in raised position at said portion of the socket 24 in order to provide a one-way detachment of the stud member 11 from the socket member 10, as later described.

Fashioned from the material of the ring-like seat or supplemental bottom wall 21 is a key member 26 which extends into the socket 24 substantially centrally with respect to the inwardly pressed seat 25, and is adapted to fit in the split 27 of the ring 23, as clearly seen in Fig. 3 of the drawing, thus positively maintaining the split of the ring at all times in alinement with the seat or bearing 25.

The stud member 11 may be of any form and construction. However, in the accompanying drawing, this member comprises two parts 28 and 29 within and between which the support 30 for the stud is arranged. The part 28 has an annular head 31 which is U-shaped or semi-circular in cross-sectional form, the inner annular wall 32 of the head terminating in an inturned annular flange 33, adapted to be engaged by an outwardly turned flange 34 on the center sleeve 35 of the part 29. The outer wall portion 36 is tapered inwardly and forms an annular recess 37 on the part 28 for the reception of the spring 23 in retaining the stud or the head 31 thereof against displacement from the socket. The outer wall portion 36 of the part 28, joins the annular base 38 of said part in an offset shoulder portion 39 which fits snugly but freely in the opening 40 of the socket member 10 when the parts are in normal position, as seen in Fig. 1 of the drawing.

The recess 37 on the part 28 forms the outer annular protruding portion 41 of the head 31 and in attempting to simply pull the members 10 and 11 apart axially thereof, or in attempting to separate the members in any direction other than at the point or section defined by the seat or bearing 25, the enlargement 41 engages the spring 23, moving the same upon the inturned bevelled wall 22 of the socket member, checking separation of said members. However, by pulling upon the members 10 and 11 at a point substantially in alinement with the seat or bearing 25 and the split 27 in the ring 23, the socket and stud members will be freely separated, as is clearly illustrated in Fig. 2 of the drawing. The seat or bearing 25 in the first place holds the ring or split end portions thereof in raised position in the socket 24, and further by maintaining the split of the ring 27 at the point where the enlargement 41 engages the ring, the ring is left free to expand to its fullest extent.

With this construction, a more positive control of one-way separation of stud and socket members is provided and a free uncoupling of said members is possible at all times. On the other hand, a greater assurance for checking separation of the socket and stud members at other sections circumferentially thereof is provided.

With my improved construction, it will also be apparent that the peripheral wall of the casing 12 of the socket member is not weakened in any material way by being circumferentially continuous, and this wall is reinforced by the inwardly pressed seat or bearing 25, where the ring portion of the socket member is stamped out to form the key element 26, thus from a standpoint of coupling and uncoupling of the socket and stud members, the present structure is as strong as any other socket member of this type and kind which would not include the key element 26.

Having fully described my invention, what I claim as new and desire to secure by Letters Patent is:

1. A snap fastener socket member for use with a stud member, said socket member comprising a cup shaped casing having a reduced and substantially closed mounting end portion, means on said end portion for securing the socket member to a support, the other end of the casing being defined by contracted walls forming at said end portion of said socket member a recess, a split spring ring in said recess adapted to engage a stud member in retaining the stud and socket members together, the contracted wall of said casing having an inwardly bent bearing portion supporting the spring ring in raised position in said recess in controlling, on the socket member, the one-way detachment of the stud member therefrom, the split of the ring being positioned in registering alinement with said bearing portion, and means formed integrally with the casing at said bearing portion and positioned between the split end of said ring for retaining said ring against shifting movement in the recess of said socket member.

2. A snap fastener socket member for use with a stud member, said socket member comprising a cup shaped casing having a reduced and substantially closed mounting end portion, means on said end portion for securing the socket member to a support, the other end of the casing being defined by contracted walls forming at said end portion of said socket member a recess, a split spring ring in said recess adapted to engage a stud member in retaining the stud and socket members together, the contracted wall of said casing having an inwardly bent bearing portion supporting the spring ring in raised position in said recess in controlling, on the socket member, the one-way detachment of the stud member therefrom, the split of the ring being positioned in registering alinement with said bearing portion, means formed integrally with the casing at said bearing portion and positioned between the split ends of said ring for retaining said ring against shifting movement in the recess of said socket member, and said last named means being formed from part of the first named end portion of the casing of said socket member.

3. A snap fastener socket member comprising a cup shaped body adapted to be secured to a support, a split spring ring, means at the open end portion of said body for supporting the ring against displacement therefrom, means on said body arranged between the split of said ring for retaining the ring against shifting movement in said body, and means adjacent the last named means for limiting movement of the split portion of the ring axially of said body in controlling the position of one-way detachment of a stud member with said socket member.

4. A snap fastener socket member comprising a cup shaped body, said body having an end wall portion substantially closing one end of the body, the other end of said body being open, a split spring ring in the open end portion of said body, the walls of the open end of said body being formed to retain said ring against displacement therefrom, said walls having an inwardly pressed bearing portion for supporting the split portion of the ring adjacent the closed end portion of said body, and the closed end portion of the body having an inwardly pressed key member arranged in the split of the ring to retain said ring against circumferential shifting movement in said body.

5. In socket members of snap fastener devices employing a cup shaped casing with a split spring ring mounted in said casing, means on the casing retaining the ring against displacement therefrom, said means comprising a closed end wall portion on the casing and an interned side wall, and a key member formed from the closed end wall of the casing and extending into the casing adjacent the side wall and positioned between the split ends of said ring for retaining said ring against circumferential shifting movement in said casing.

6. In socket members of snap fastener devices employing a cup shaped casing with a split spring ring mounted in said casing, means on the casing retaining the ring against displacement therefrom, said means comprising a closed end wall portion on the casing and an interned side wall, a key member formed from the closed end wall of the casing and extending into the casing adjacent the side wall and positioned between the split ends of said ring for retaining said ring against circumferential shifting movement in said casing, and other means on the casing engaging the split end portions of said ring to limit axial movement of said split ends of the ring in said casing.

7. A socket member for snap fasteners of the character described, said socket member comprising a casing having a large stud receiving opening at one end, the other end of the casing having a closure wall, the casing intermediate the ends thereof having a side wall circumferentially enlarged to form a ring receiving and retaining recess, a split spring ring in said recess, and means formed integrally with said closure wall of said casing and extending into said recess and the split of said ring for retaining the ring against circumferential shifting in said recess.

8. A socket member for snap fasteners of the character described, said socket member comprising a casing having a large stud receiving opening at one end, the other end of the casing having a closure wall, the casing intermediate the ends thereof having a side wall circumferentially enlarged to form a ring receiving and retaining recess, a split spring ring in said recess, means formed integrally with said closure wall of said casing and extending into said recess and the split of said ring for retaining the ring against circumferential shifting in said recess and other means on the casing adjacent said last named means for limiting axial movement of the split ends of said ring in said recess.

OTTO J. HUELSTER.

REFERENCES CITED

The following references are of record in the file of this patent:

UNITED STATES PATENTS

| Number | Name | Date |
|---|---|---|
| 1,188,896 | Carr | June 27, 1916 |
| 2,328,016 | Huelster | Aug. 31, 1943 |